(12) United States Patent
Yamazaki et al.

(10) Patent No.: US 7,178,435 B2
(45) Date of Patent: Feb. 20, 2007

(54) GLASS SUBSTRATE AND DISPLAY APPARATUS

(75) Inventors: Shunpei Yamazaki, Tokyo (JP); Jun Koyama, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 171 days.

(21) Appl. No.: 10/113,004

(22) Filed: Mar. 29, 2002

(65) Prior Publication Data

US 2002/0197421 A1    Dec. 26, 2002

(30) Foreign Application Priority Data

Mar. 30, 2001    (JP)    ............................. 2001-098019

(51) Int. Cl.
 C03B 33/02    (2006.01)
 G02F 1/133    (2006.01)
(52) U.S. Cl. ............................. 83/39; 83/42; 349/158
(58) Field of Classification Search ................ 83/880, 83/886, 34, 39, 42, 75.5, 76.6; 225/1, 96; 33/1 G, 1 F, 66, 11; 349/158, 159
 See application file for complete search history.

(56) References Cited

U.S. PATENT DOCUMENTS

| | | | | |
|---|---|---|---|---|
| 3,164,046 A | * | 1/1965 | Arnaud | 83/880 |
| 3,242,573 A | * | 3/1966 | Noel | 33/1 G |
| 3,245,295 A | * | 4/1966 | Mueller | 83/56 |
| 3,343,436 A | * | 9/1967 | Cockrell | 83/884 |
| 3,600,993 A | * | 8/1971 | Williams et al. | 83/76.5 |
| 5,244,847 A | * | 9/1993 | Kushitani et al. | 501/66 |
| 5,815,231 A | | 9/1998 | Nishi et al. | |
| 5,856,856 A | * | 1/1999 | Malhi | 349/84 |
| 5,875,008 A | * | 2/1999 | Takahara et al. | 349/5 |
| 5,982,469 A | | 11/1999 | Awane et al. | 349/151 |
| 6,099,672 A | | 8/2000 | Yamazaki et al. | 156/109 |
| 6,201,591 B1 | | 3/2001 | Awane et al. | |
| 6,202,524 B1 | * | 3/2001 | Cunningham | 83/13 |
| 6,304,307 B1 | | 10/2001 | Nishi et al. | |
| 6,326,225 B1 | | 12/2001 | Yamazaki et al. | |
| 6,327,015 B2 | | 12/2001 | Awane et al. | |
| 6,417,898 B1 | * | 7/2002 | Izumi | 349/73 |

(Continued)

FOREIGN PATENT DOCUMENTS

GB    1077935    8/1967

(Continued)

OTHER PUBLICATIONS

Australian Patent Office Search Report re application No. SG 200201697-0, mailed Jan. 6, 2004.

*Primary Examiner*—Stephen Choi
(74) *Attorney, Agent, or Firm*—Cook, Alex, McFarron, Manzo, Cummings & Mehler, Ltd.

(57) ABSTRACT

Glass substrates for display apparatuses of the related art which is cut from the mother glass have different glass size from each other in accordance with demand of respective display apparatus manufacturing company or factory. Therefore, it is not always effective to form glass substrates by cutting the mother glass, and the mother glass is not used efficiently.

The present invention is characterized in that when a glass substrate is prepared by cutting a rectangular mother glass, one side of the mother glass is one side of the glass substrate and the mother glass has a length equal to a length of the one side of the glass substrate.

10 Claims, 8 Drawing Sheets

U.S. PATENT DOCUMENTS

| | | | |
|---|---|---|---|
| 6,680,761 B1 * | 1/2004 | Greene et al. | 349/73 |
| 2001/0024083 A1 | 9/2001 | Yamazaki et al. | |
| 2003/0226433 A1 * | 12/2003 | Passant | 83/13 |

FOREIGN PATENT DOCUMENTS

| | | |
|---|---|---|
| GB | 2025107 | 1/1980 |
| JP | 57-041198 | 3/1982 |
| JP | 62-100440 | 5/1987 |
| JP | 07-100799 | 4/1995 |
| JP | 10-197856 | 7/1998 |
| JP | 11-343132 | 12/1999 |
| JP | 2000-016826 | 1/2000 |
| SU | 1087477 A | 4/1984 |

* cited by examiner

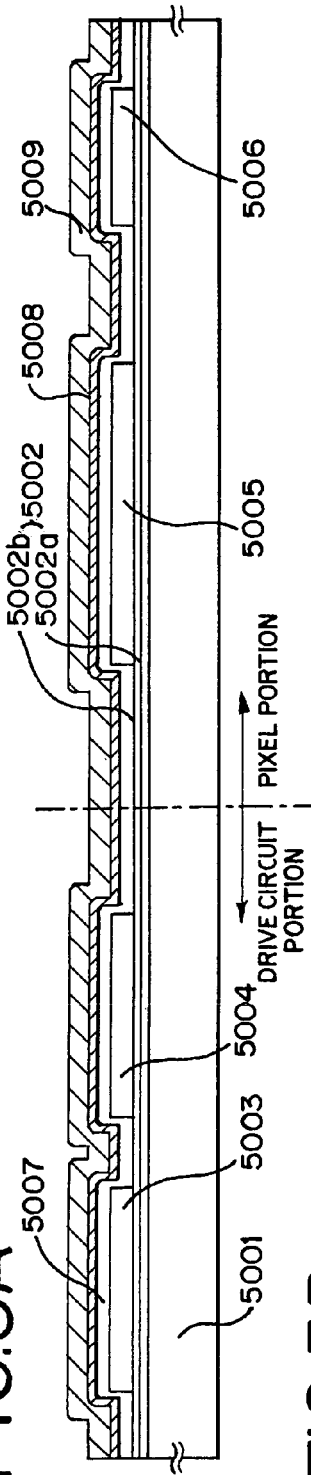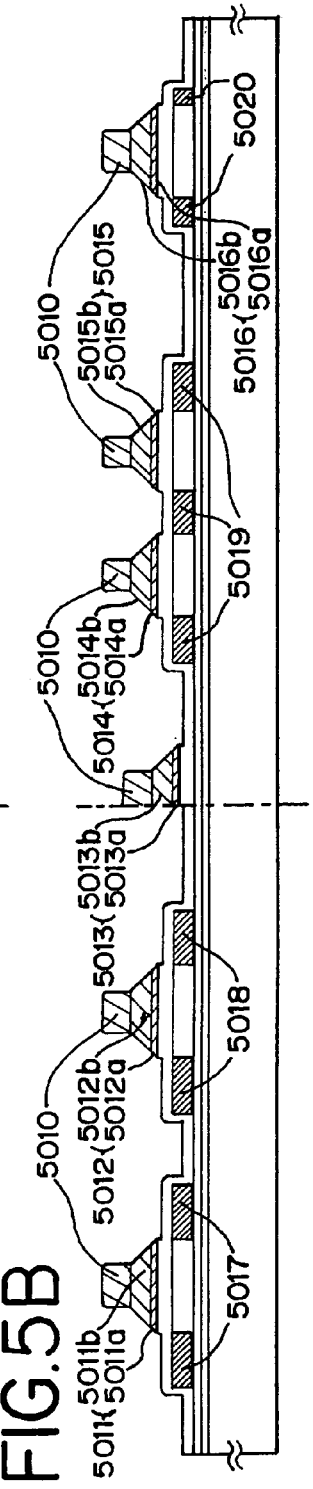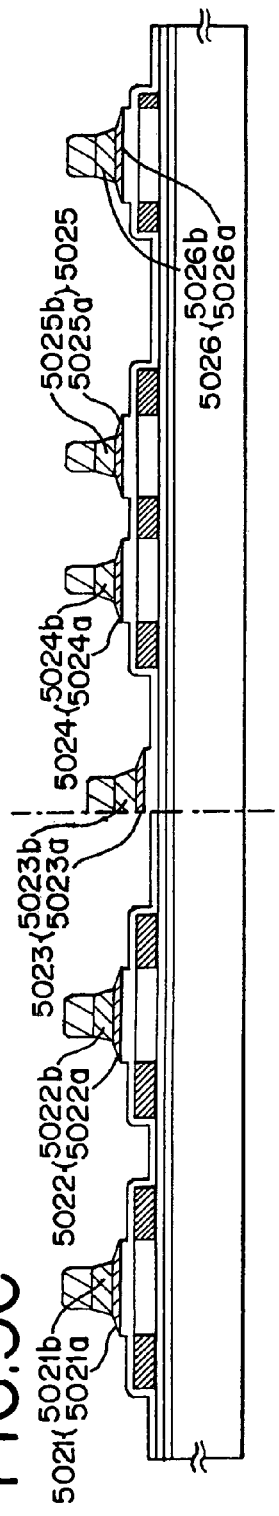

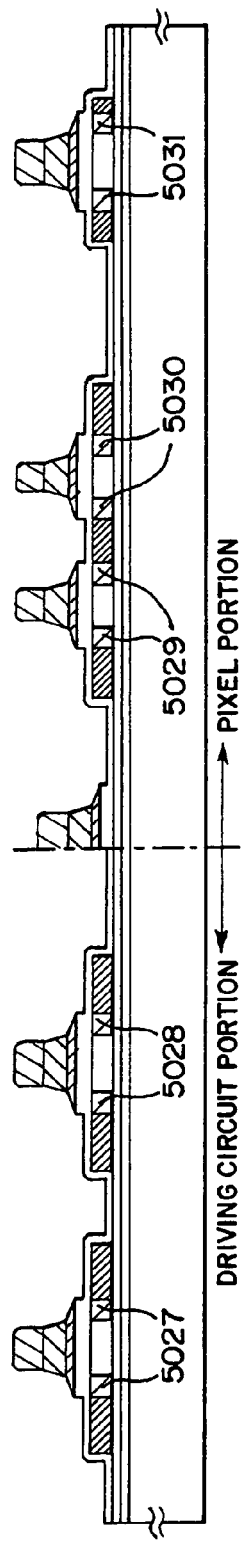
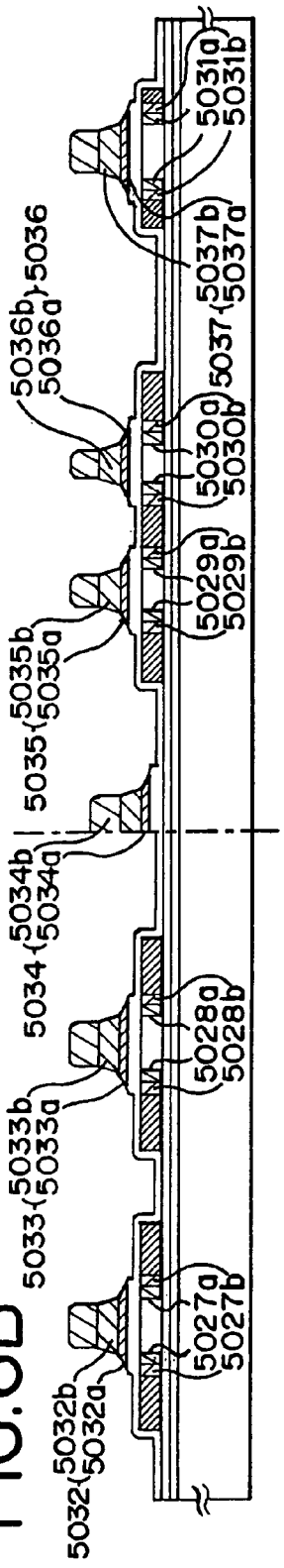
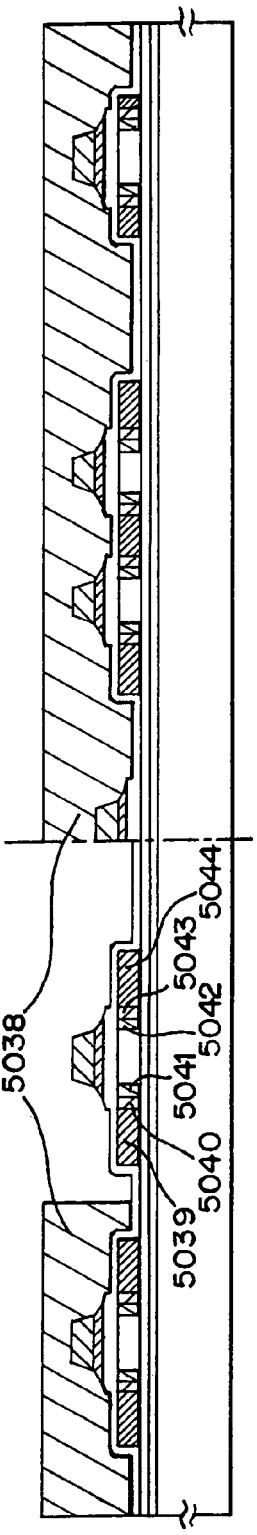

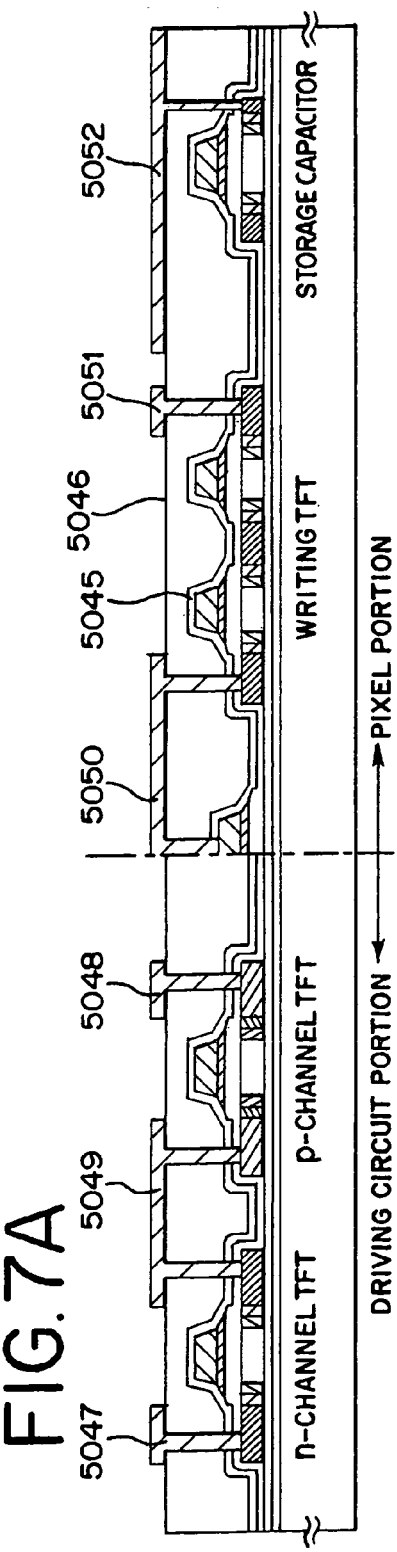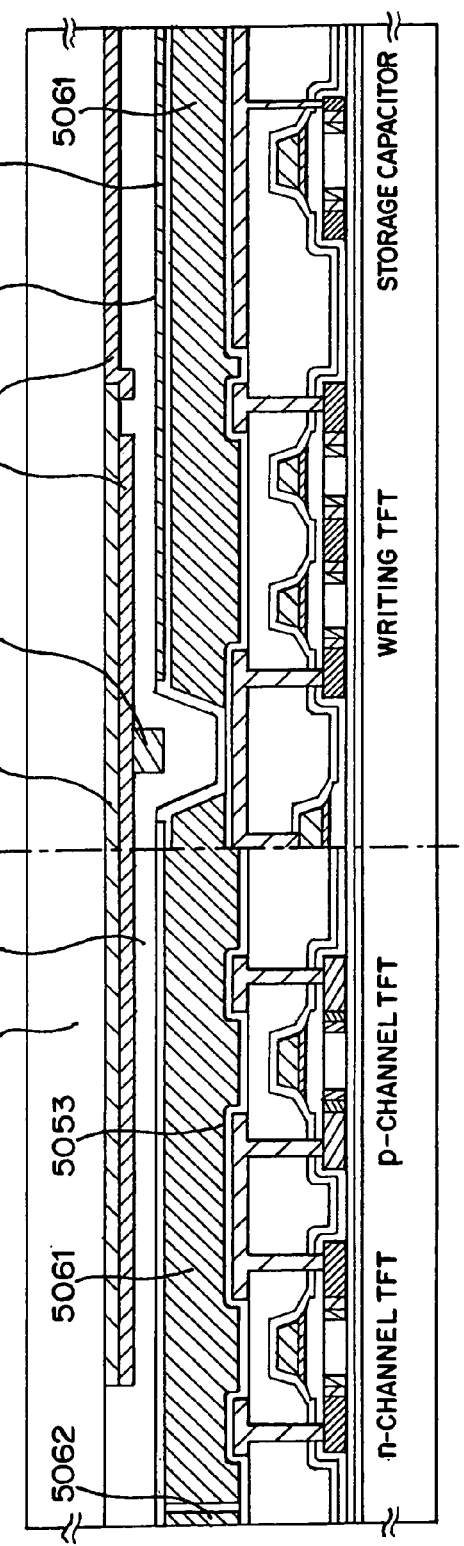

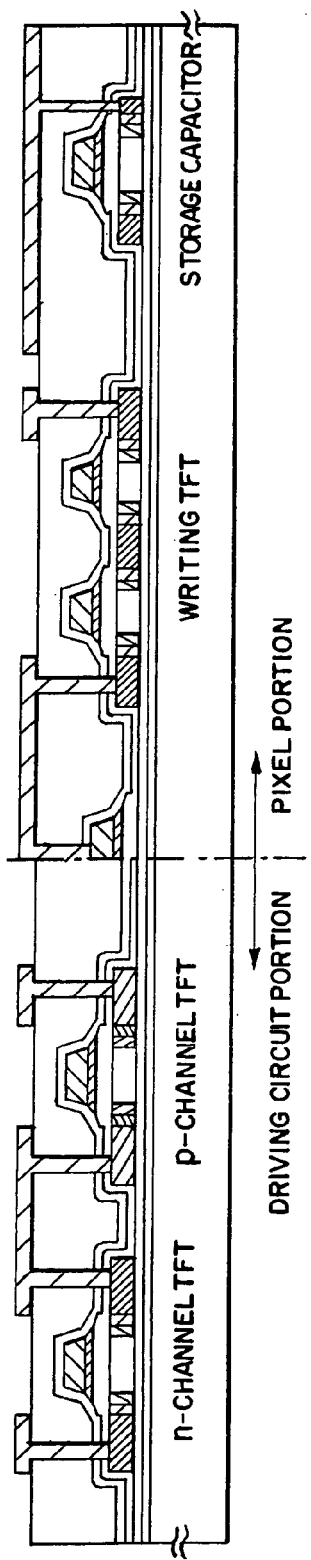
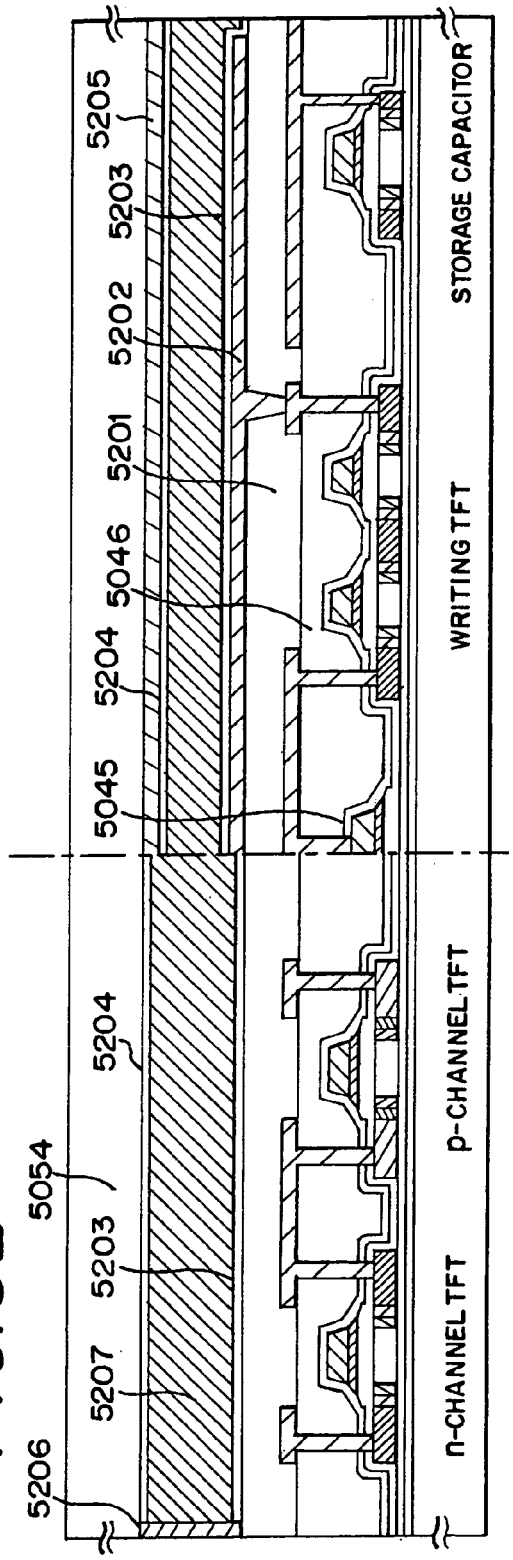

TABLE 1  1600×1200  QUANTITY OF PANELS EXTRACTED FROM GLASS SUBSTRATE

| SCREEN ASPECT | QUANTITY | MAXIMUM PANEL SIZE | SCREEN AREA | PANEL AREA | TOTAL PANEL AREA | UTILIZATION FACTOR % |
|---|---|---|---|---|---|---|
| 4:3 | 2×2 | 36.4 INCH | 739×554 | 749×569 | 1498×1138 | 88.8 |
|  | 3×3 | 24 INCH | 488×365 | 498×380 | 1494×1140 | 88.7 |
|  | 4×4 | 17.7 INCH | 359×270 | 369×285 | 1476×1140 | 87.6 |
| 16:9 | 2×2 | 34 INCH | 755×425 | 765×440 | 1530×880 | 70.1 |
|  | 2×3 | 29 INCH | 644×362 | 654×377 | 1308×1131 | 77 |
|  | 3×3 | 21.6 INCH | 479×269 | 489×284 | 1467×1137 | 86.8 |

GLASS SIZE        1600×1200
USABLE RANGE   1540×1140
FRAME              15 VERTICAL 10 HORIZONTAL (UNIT IS mm)

UTILIZATION FACTOR= GLASS SUBSTRATE AREA/MOTHER GLASS AREA

TABLE 2-1  1500×1125  QUANTITY OF PANELS EXTRACTED FROM GLASS SUBSTRATE

| SCREEN ASPECT | QUANTITY | MAXIMUM PANEL SIZE | SCREEN AREA | PANEL AREA | TOTAL PANEL AREA | UTILIZATION FACTOR % |
|---|---|---|---|---|---|---|
| 4:3 | 2×2 | 33.9 INCH | 689×517 | 699×532 | 1398×1064 | 88.1 |
|  | 3×3 | 22.3 INCH | 453×340 | 463×355 | 1389×1065 | 87.7 |
|  | 4×4 | 16.5 INCH | 334×251 | 344×266 | 1376×1064 | 86.8 |
| 16:9 | 2×2 | 32.0 INCH | 710×399 | 720×414 | 1440×828 | 70.6 |
|  | 2×3 | 27.2 INCH | 604×340 | 614×355 | 1228×1065 | 77.5 |
|  | 3×3 | 21.1 INCH | 471×264 | 480×279 | 1440×837 | 71.4 |

GLASS SIZE        1500×1125
USABLE RANGE      1440×1065
FRAME             15 VERTICAL 10 HORIZONTAL (UNIT IS mm)

TABLE 2-2  2000×1500  QUANTITY OF PANELS EXTRACTED FROM GLASS SUBSTRATE

| SCREEN ASPECT | QUANTITY | MAXIMUM PANEL SIZE | SCREEN AREA | PANEL AREA | TOTAL PANEL AREA | UTILIZATION FACTOR % |
|---|---|---|---|---|---|---|
| 4:3 | 2×2 | 46.2 INCH | 940×705 | 950×720 | 1900×1440 | 91.2 |
|  | 3×3 | 30.5 INCH | 620×465 | 630×480 | 1890×1440 | 90.2 |
|  | 4×4 | 22.6 INCH | 460×345 | 470×360 | 1880×1440 | 90.2 |
| 16:9 | 2×2 | 43.2 INCH | 960×540 | 970×555 | 1940×1110 | 71.8 |
|  | 2×3 | 37.2 INCH | 826×465 | 836×480 | 1672×1440 | 80.2 |
|  | 3×3 | 28.6 INCH | 636×357 | 646×372 | 1938×1116 | 72.1 |

GLASS SIZE        2000×1500
USABLE RANGE      1940×1440
FRAME             15 VERTICAL 10 HORIZONTAL (UNIT IS mm)

TABLE 2-3  2600×1500  QUANTITY OF PANELS EXTRACTED FROM GLASS SUBSTRATE

| SCREEN ASPECT | QUANTITY | MAXIMUM PANEL SIZE | SCREEN AREA | PANEL AREA | TOTAL PANEL AREA | UTILIZATION FACTOR % |
|---|---|---|---|---|---|---|
| 4:3 | 2×2 | 46.2 INCH | 940×705 | 950×720 | 1900×1440 | 70.1 |
|  | 3×2 | 41.1 INCH | 836×627 | 846×642 | 2538×1284 | 83.5 |
|  | 4×3 | 30.5 INCH | 620×465 | 630×480 | 2520×1440 | 93 |
| 16:9 | 2×2 | 56.4 INCH | 1253×705 | 1263×720 | 2526×1440 | 93.2 |
|  | 3×3 | 37.2 INCH | 826×465 | 836×480 | 2508×1440 | 92.6 |
|  | 4×4 | 27.6 INCH | 613×345 | 623×360 | 2492×1440 | 92 |

GLASS SIZE        2600×1500
USABLE RANGE      2540×1440
FRAME             15 VERTICAL 10 HORIZONTAL (UNIT IS mm)

UTILIZATION FACTOR = TOTAL PANEL AREA / GLASS AREA

GLASS SUBSTRATE AND DISPLAY APPARATUS

BACKGROUND OF THE INVENTION

1. Field of the Invention

The present invention relates to a glass substrate and, more particularly, to a glass substrate to be used for a display apparatus.

2. Description of the Related Art

A glass substrate for a display apparatus according to the related art has been produced by the following method. FIG. 2 shows a method called a float method.

First, a glass material 204 is melted in a melting furnace 201 and is fed into a float bath 202. The float bath 202 contains a molten tin 205 and the glass material 204 spreads thin on the molten tin 205. As glass passes through the float bath 202, the glass is formed to have a predetermined width and a predetermined thickness. Next, glass 206 is pulled toward a cooling furnace 203 from the glass-outlet side end of the float bath 202. The cooling furnace 203 has a length of several tens of meters, so that as the glass passes through the furnace, the glass is cooled down.

The glass formed here is called a mother glass or glass ribbon. The mother glass has a short side ranging from several tens of centimeters to several meters and is drawn into a band shape.

The mother glass often has a rectangular shape. In case where the mother glass has a rectangular shape, longer two of the four sides of the mother glass are called long sides and the other two sides shorter than the long sides are called short sides.

After cooled, the mother glass is cut and undergoes steps, such as surface polishing, cleaning and inspection. Thereafter, the resultant mother glasses will be distributed to companies that need the mother glasses, such as display apparatus manufacturing companies.

Glass substrates for display apparatuses of the related art have different glass size from each other in accordance with demand of respective display apparatus manufacturing company or factory. Therefore, a glass manufacturing company cuts a mother glass in accordance with the demands of each demander.

Each display apparatus manufacturing company has demanded the glass manufacturing company to supply glasses of the desired sizes in accordance with display apparatuses to be manufactured.

In case of manufacturing 15-inch display apparatuses, for example, a glass substrate of 550 mm×650 mm, a size that provides four panels, has been used.

As apparent from the foregoing description, sizes of glass substrates for display apparatuses, which are prepared by cutting a mother glass, differ from one display apparatus manufacturing company or factory to another. Therefore, it is not always the case where cutting glass substrates away from a mother glass is carried out efficiently and mother glasses are not used efficiently. One example of such an inefficient usage is illustrated in FIG. 3. FIG. 3 shows a case where glass substrates for 550 mm×650 mm display apparatuses are cut away from a mother glass having short sides of 1 m. In this case, the mother glass includes a lot of areas that are not actually used. This results in a wasteful use of the mother glass.

SUMMARY OF THE INVENTION

In consideration of the above-described situations, the invention aims at providing a glass substrate which can effectively use a mother glass. The invention also aims at providing a glass substrate which improves the utilization factor of a mother glass.

The construction according to the invention will be described below.

The invention provides a glass substrate prepared by cutting a rectangular mother glass, wherein one side of the mother glass is one side of the glass substrate; and wherein the mother glass has a length equal to a length of the one side of the glass substrate.

The invention provides a glass substrate prepared by cutting a rectangular mother glass characterized in that the length of the one side of the mother glass being equal to or greater than 1000 mm;

the glass substrate having an aspect ratio of 4:3, and the mother glass having a utilization factor of 87% or greater.

The invention provides a glass substrate prepared by cutting a rectangular mother glass characterized in that:

the length of the one side of the mother glass being equal to or greater than 1000 mm;

the glass substrate having an aspect ratio of 16:9, and the mother glass having a utilization factor of 70% or greater.

The invention further provides a glass substrate prepared by cutting a rectangular mother glass, wherein one side of the mother glass is one side of the glass substrate, and wherein a length of 1/n of the one side of the mother glass is equal to a length of the one side of the glass substrate where n is a natural number equal to or greater than 2.

The invention provides a glass substrate prepared by cutting a rectangular mother glass characterized in that:

a length of the one side of the mother glass being equal to a length of the one side of the glass substrate;

the length of the one side of the mother glass being equal to or greater than 3000 mm and a length of an other side of the mother glass being equal to or greater than 5200 mm;

a plurality of panels obtained by dividing the glass substrate having an aspect ratio of 4:3, and the plurality of the panels having a utilization factor of 70% or greater respect to the glass substrate.

The invention provides a glass substrate prepared by cutting a rectangular mother glass characterized in that:

a length of the one side of the mother glass being equal to a length of the one side of the glass substrate;

the length of the one side of the mother glass being equal to or greater than 3000 mm and a length of an other side of the mother glass being equal to or greater than 5200 mm;

a plurality of panels obtained by dividing the glass substrate having an aspect ratio of 16:9, and the plurality of the panels having a utilization factor of 92% or greater respect to the glass substrate.

BRIEF DESCRIPTION OF THE DRAWINGS

FIGS. 5A through 5C are diagrams showing the cross-sectional structure of a liquid crystal display apparatus;

FIGS. 6A through 6C are diagrams showing the cross-sectional structure of a liquid crystal display apparatus;

FIGS. 7A and 7B are diagrams showing the cross-sectional structure of a liquid crystal display apparatus; and FIGS. 8A and 8B are diagrams showing the cross-sectional structure of a liquid crystal display apparatus.

DETAILED DESCRIPTION OF THE PREFERRED EMBODIMENTS

A glass substrate according to the invention will be described below with reference to the accompanying drawings.

As mentioned earlier, one side of the glass substrate according to the invention is a short side of a mother glass. Further; 1/n of the short side of the mother glass is set as one side of the glass substrate.

Figure 1:
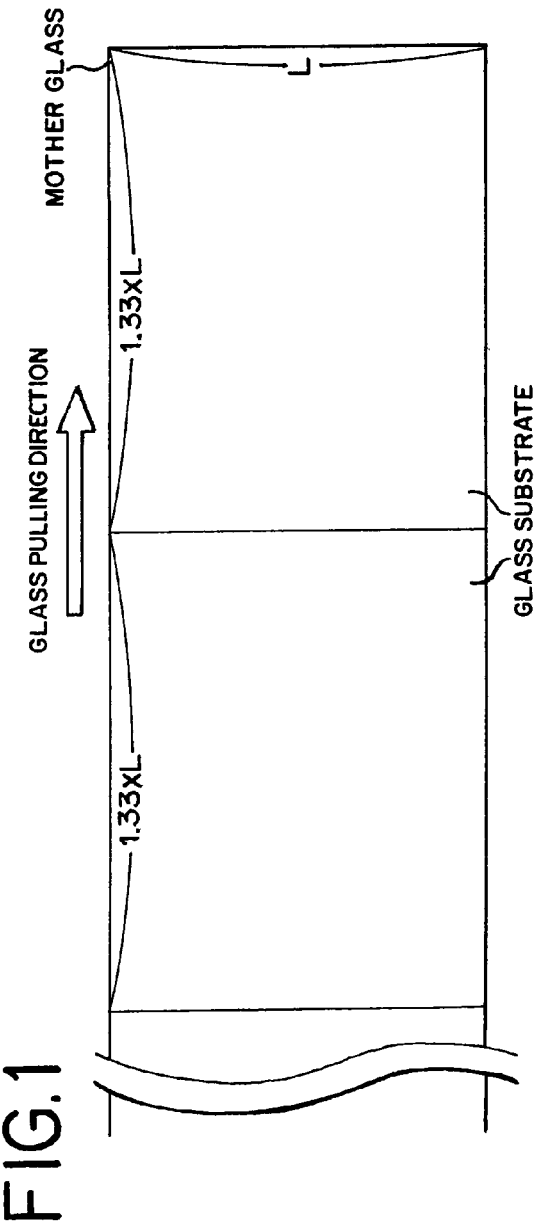
FIG. 1 is a diagram showing cut of glass substrates from a mother glass according to the invention.
Figure 2:
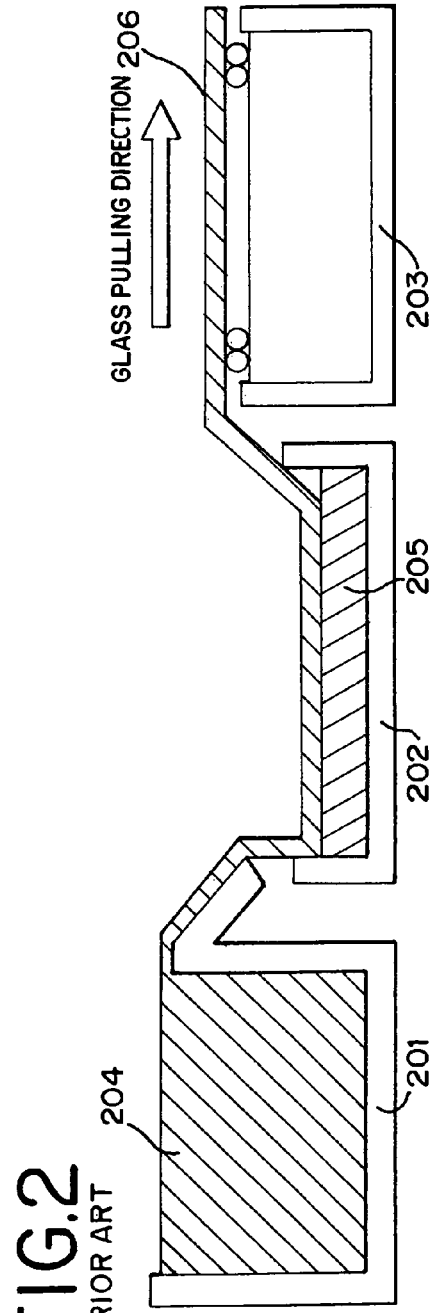
FIG. 2 is a diagram illustrating a method of manufacturing a mother glass.
Figure 3:
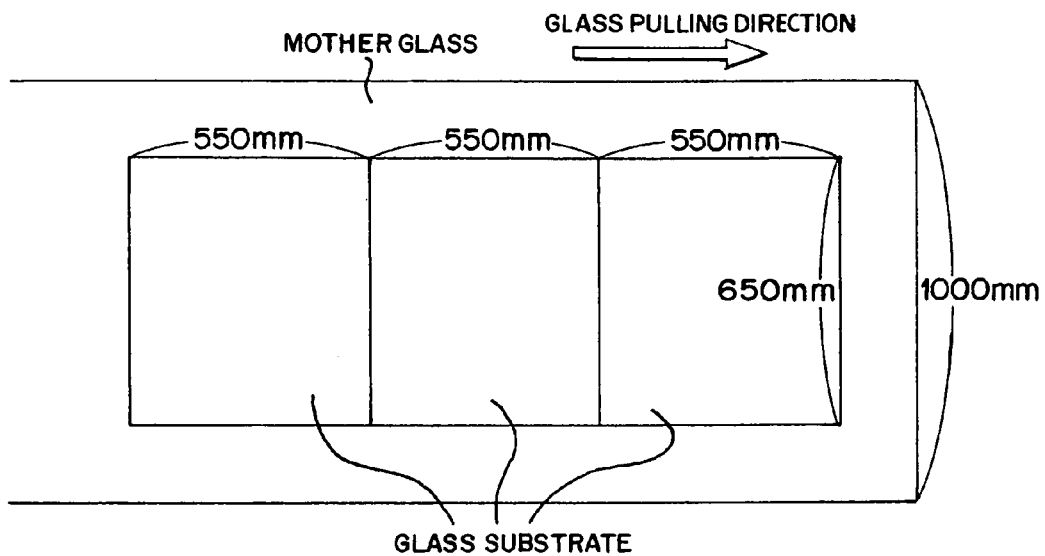
FIG. 3 is a diagram showing cut of glass substrates from a mother glass according to the related art.

Referring to FIG. 1, a description will now be given of a case where with the short side of a mother glass having a length of L m, a glass substrate having an aspect ratio of 4:3 is prepared. At this time, if the length of the side that has a ratio of "3" is set to L, the side that has a ratio of "4" has a length of 1.33×L. The invention can construct a glass substrate for a display apparatus, which has such side lengths. The glass substrate is divided into four or nine segments to prepare display apparatuses. Because the short sides of the mother glass are aligned with one side of the glass substrate in the invention, the mother glass is not wastefully used. This improves the utilization factor of the mother glass.

Figure 4:
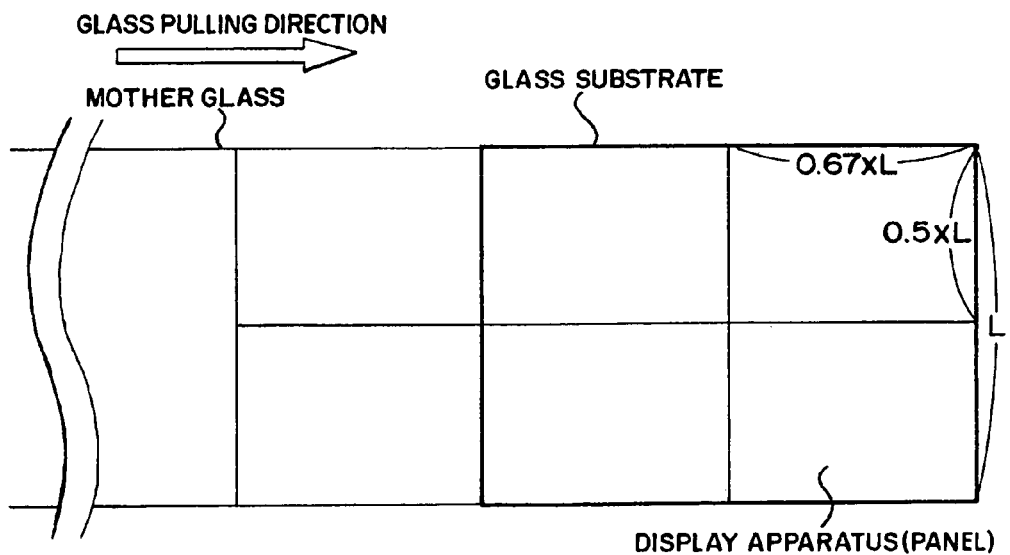
FIG. 4 is a diagram showing cut of glass substrates from a mother glass according to the invention.

In case of segmentation of the glass substrate into four pieces, as shown in FIG. 4, the size of the display apparatus (panel) can be set about 0.67×L:0.5×L. Because 1/n (here, n is 2) of the short sides of the mother glass are aligned with one side of the glass substrate, the mother glass is not wastefully used. This improves the utilization factor of the mother glass.

A description will now be given of a case where with the short side of a mother glass having a length of L m, a glass substrate having an aspect ratio of 4:3 is prepared. At this time, if the length of the side that has a ratio of "4" is set to L, the side that has a ratio of "3" has a length of 0.75×L. The invention can construct a glass substrate for a display apparatus, which has such side lengths. The glass substrate is divided into four or nine segments to prepare display apparatuses. In case of the quadruple segmentation, the possible size of the display apparatus becomes about 0.5×L:0.375×L. Because the short sides of the mother glass or n/1 of that are aligned with one side of the glass substrate in the invention, the mother glass is not wastefully used. This improves the utilization factor of the mother glass.

Although the aspect ratio of the glass substrate is set to 4:3 in this embodiment, the aspect ratio is not limited to this value. As real display apparatuses require areas around the display portion for a display circuit, a sealing space and adhesion of a flexible board, those areas may be added to the aspect ratio. Because the recent high-definition display apparatuses have a screen aspect ratio of 16:9, the aspect ratio of the glass substrate may be matched with or conform to this value.

As the actual preparation of glass substrates by cutting a mother glass leaves fractions of the order of inches, the fractions are discarded. Thereby, the utilization factor from glass substrates is reduced slightly, but it is a negligible level.

As the size of a display apparatus or the like is determined by determining the size of the glass substrate from the size of the mother glass this way, the mother glass can be used efficiently. Needless to say, the size of an apparatus which manufactures display apparatuses using glass substrates should be matched with the size of the glass substrates. As discussed above, the invention can use mother glasses substantially wastelessly, thus making it possible to improve the utilization factor of the mother glasses.

Some examples of the invention will be discussed below.

[First Embodiment]

Table 1 shows examples when the short sides of a mother glass being 1200 mm are aligned with a short side of a glass substrate.

Table 1

In the examples, the mother glass has an aspect ratio of 4:3 and a size of 1600 mm×1200 mm. In case where a display apparatus is produced by using this mother glass, the display apparatus can have a maximum diagonal size of 36.4 inches when 2×2 or four panels are extracted from the mother glass as given in Table 1. The utilization factor of the mother glass in that case is 88.8%. The case is premised on that the peripheral portion of 30 mm of the glass substrate cannot be used and each display apparatus is assumed to have a frame (peripheral circuit, FPC, sealing, etc.) of a total 15 mm vertically and a total of 10 mm horizontally. However, this embodiment is not limited to size of the peripheral portion of the glass substrate and size of the frame.

Note that the utilization factor is a value indicating the relationship between the area of a mother glass and the area of a glass substrate prepared by cutting the mother glass. More specifically, the utilization factor indicates the area of a glass substrate divided by the area of the mother glass shown by "%".

Here, a glass substrate area means a total panel area. As shown in Table 1, when the screen aspect is 4:3 the utilization factor is 87% or greater, and when the screen aspect is 16:9 the utilization factor is 70% or greater.

Tables 2-1 through 2-3 show examples in which the short sides of a mother glass are 3000 mm and a half of the length is aligned with one side of a glass substrate. Table 2-1 shows the example where a half the length of the short side of the mother glass is used for the long side of the glass substrate. Table 2-2 shows the example where it is used for the short side of the glass substrate (the aspect ratio of the glass substrates being 4:3 in both examples). Table 2-3 also shows the example where a half the length of the short side of the mother glass is used for the short side of the glass substrate and the aspect ratio of the glass substrate is set to 16:9. The preconditions for those examples are the same as the examples given in Table 1. However, this example is not limited to the preconditions.

Note that the utilization factor shown in Tables 2-1 through 2-3 is a value indicating the relationship between the area of a glass substrate and the total area of a plurality of panels prepared from the glass substrate. More specifically, the utilization factor indicates the total area of the plurality of panels divided by the area of the glass substrate shown by "%". Thus, the utilization used in Table 1 differs from that used in Tables 2-1 through 2-3. Tables 2-1 through 2-3

As shown in Tables 2-1 through 2-3, when the screen aspect is 4:3 the utilization factor is 70% or greater, and when the screen aspect is 16:9 the utilization factor is also 70% or greater.

As the short side of a mother glass or 1/n of the short side of the mother glass is aligned with one side of a glass substrate, the mother glass can be used efficiently. This leads to an improvement of the utilization factor of the mother glass.

[Second Embodiment]

The following is an example of manufacturing a liquid crystal display device using a glass substrate cutting from a mother glass in accordance with the present invention.

The liquid crystal display device is shown as an example of a display in this embodiment. However, the present invention is not limited to the liquid crystal display device, the present invention can be also applied to the display device using OLED or the display device using the glass substrate such as PDP device.

In the following, a method of simultaneously manufacturing TFTs of driving circuit portions provided in the pixel portion and the periphery thereof on the glass substrate is described. However, in order to simplify the explanation, a CMOS circuit, which is the basic unit for the driving circuit portion, is shown in the figures.

In relation to the pixel portion, the writing TFT, the source signal line and the storage capacitor are only illustrated.

First, as shown in FIG. 5A, a base film 5002 (5002a, 5002b) made of an insulating film such as a silicon oxide film, a silicon nitride film, or a silicon nitride oxide film is formed on a substrate 5001 made of glass such as barium borosilicate glass or alumino borosilicate glass, typified by #7059 glass or #1737 glass of Corning Inc. For example, a silicon nitride oxide film 5002a fabricated from $SiH_4$, $NH_3$ and $N_2O$ by a plasma CVD method is formed with a thickness of 10 to 200 nm (preferably 50 to 100 nm), and a hydrogenated silicon nitride oxide film 5002b similarly fabricated from $SiH_4$ and $N_2O$ is formed with a thickness of 50 to 200 nm (preferably 100 to 150 nm) to form a lamination. In Embodiment 2, although the base film 5002 is shown as the two-layer structure, the film may be formed of the foregoing insulating film as a single layer film or a lamination structure of more than two layers.

Island semiconductor layers 5003 to 5006 are formed of a crystalline semiconductor film manufactured by using a laser crystallization method on a semiconductor film having an amorphous structure, or by using a known thermal crystallization method. The thickness of the island semiconductor films 5003 to 5006 is set from 25 to 80 nm (preferably between 30 and 60 nm). There is no limitation on the crystalline semiconductor film material, but it is preferable to form the film from silicon or a silicon germanium (SiGe) alloy.

A laser such as a pulse oscillation type or continuous emission type excimer laser, a YAG laser, or a $YVO_4$ laser is used for manufacturing the crystalline semiconductor film in the laser crystallization method. A method of condensing laser light emitted from a laser oscillator into a linear shape by an optical system and then irradiating the light to the semiconductor film may be employed when these types of lasers are used. The crystallization conditions may be suitably selected by the operator, but the pulse oscillation frequency is set to 30 Hz, and the laser energy density is set from 100 to 400 mJ/cm$^2$ (typically between 200 and 300 mJ/cm$^2$) when using the excimer laser. Further, the second harmonic is utilized when using the YAG laser, the pulse oscillation frequency is set from 1 to 10 kHz, and the laser energy density may be set from 300 to 600 mJ/cm$^2$ (typically between 350 and 500 mJ/cm$^2$). The laser light which has been condensed into a linear shape with a width of 100 to 1000 μm, for example 400 μm, is then irradiated over the entire surface of the substrate. This is performed with an overlap ratio of 80 to 98%.

Next, a gate insulating film 5007 is formed covering the island semiconductor layers 5003 to 5006. The gate insulating film 5007 is formed of an insulating film containing silicon with a thickness of 40 to 150 nm by a plasma CVD method or a sputtering method. A 120 nm thick silicon nitride oxide film is formed in Embodiment 2. The gate insulating film is not limited to such a silicon nitride oxide film, of course, and other insulating films containing silicon may also be used, in a single layer or in a lamination structure. For example, when using a silicon oxide film, it can be formed by the plasma CVD method with a mixture of TEOS (tetraethyl orthosilicate) and $O_2$, at a reaction pressure of 40 Pa, with the substrate temperature set from 300 to 400° C., and by discharging at a high frequency (13.56 MHz) with electric power density of 0.5 to 0.8 W/cm$^2$. Good characteristics of the silicon oxide film thus manufactured as a gate insulating film can be obtained by subsequently performing thermal annealing at 400 to 500° C.

A first conductive film 5008 and a second conductive film 5009 are then formed on the gate insulating film 5007 in order to form gate electrodes. In Embodiment 2, the first conductive film 5008 is formed from Ta with a thickness of 50 to 100 nm, and the second conductive film 5009 is formed from W with a thickness of 100 to 300 nm.

The Ta film is formed by sputtering, which a Ta target is sputtered by using Ar. If an appropriate amount of Xe or Kr is added to the Ar during sputtering, the internal stress of the Ta film will be relaxed, and film peeling can be prevented. The resistivity of an α phase Ta film is on the order of 20 μΩcm, and the α phase Ta film can be used for the gate electrode, but the resistivity of β phase Ta film is on the order of 180 μΩcm and the β phase Ta film is unsuitable for the gate electrode. The α phase Ta film can easily be obtained if a tantalum nitride film, which possesses a crystal structure near that of α phase Ta, is formed with a thickness of 10 to 50 nm as a base for Ta in order to form the α phase Ta film.

The W film is formed by sputtering with W as a target. The W film can also be formed by a thermal CVD method using tungsten hexafluoride ($WF_6$). Whichever is used, it is necessary to make the film low resistant in order to use it as the gate electrode, and it is preferable that the resistivity of the W film be set 20 μΩcm or less. The resistivity can be lowered by enlarging the crystal grain of the W film, but for cases where there are many impurity elements such as oxygen within the W film, crystallization is inhibited, and the film becomes high resistant. Therefore, a W target having a purity of 99.9999% is thus used in sputtering. In addition, by forming the W film while taking sufficient care such that no impurities from the inside of the gas phase are introduced at the time of film formation, a resistivity of 9 to 20 μΩcm can be achieved.

Note that although the first conductive film 5008 and the second conductive film 5009 are formed from Ta and W, respectively, in Embodiment 2, the conductive films are not limited to these. Both the first conductive film 5008 and the second conductive film 5009 may also be formed from an element selected from the group consisting of Ta, W, Ti, Mo, Al, and Cu, or from an alloy material or a chemical compound material having one of these elements as its main constituent. Further, a semiconductor film, typically a poly-silicon film, into which an impurity element such as phosphorous is doped, may also be used. Examples of preferable combinations other than that in Embodiment 2 include: the first conductive film 5008 formed from tantalum nitride (TaN) and the second conductive film 5009 formed from W; the first conductive film 5008 formed from tantalum nitride (TaN) and the second conductive film 5009 formed from Al; and the first conductive film 5008 formed from tantalum nitride (TaN) and the second conductive film 5009 formed from Cu.

Moreover, when you can reduce a LDD region, W single layer structure can be adopted. Even if the structure is the same as that, the length of the LDD region can be reduced by raise the taper corner.

Next, a mask 5010 is formed from resist, and a first etching process is performed in order to form electrodes and wirings. An ICP (inductively coupled plasma) etching method is used in Embodiment 2. A gas mixture of $CF_4$ and $Cl_2$ is used as an etching gas, and a plasma is generated by applying a 500 W RF electric power (13.56 MHz) to a coil shape electrode at 1 Pa. A 100 W RF electric power (13.56 MHz) is also applied to the substrate side (test piece stage), effectively applying a negative self-bias voltage thereto. The W film and the Ta film are both etched on the same order when $CF_4$ and $Cl_2$ are mixed as the etching gas.

Edge portions of the first conductive layer and the second conductive layer are made into a tapered shape by using a suitable resist mask shape and the effect of the bias voltage applied to the substrate side with the above etching conditions. The angle of the tapered portions is from 15 to 45°. The etching time may be increased by approximately 10 to 20% in order to perform etching without any residue on the gate insulating film. The selectivity of a silicon nitride oxide film with respect to a W film is from 2 to 4 (typically 3), and therefore approximately 20 to 50 nm of the exposed surface of the silicon nitride oxide film is etched by this over-etching process. First shape conductive layers 5011 to 5016 (first conductive layers 5011a to 5016a and second conductive layers 5011b to 5016b) are thus formed of the first conductive layer and the second conductive layer by the first etching process. At this point, regions of the gate insulating film 5007 not covered by the first shape conductive layers 5011 to 5016 are made thinner by approximately 20 to 50 nm by etching. (FIG. 5B)

Then, a first doping process is performed to add an impurity element for imparting an n-type conductivity. Doping may be carried out by an ion doping method or an ion injecting method. The condition of the ion doping method is that a dosage is $1\times10^{13}$ to $5\times10^{14}$ atoms/cm$^2$, and an acceleration voltage is 60 to 100 keV. As the impurity element for imparting the n-type conductivity, an element belonging to group 15, typically, phosphorus (P) or arsenic (As) is used, but phosphorus is used here. In this case, the conductive layers 5011 to 5016 become masks to the impurity element to impart the n-type conductivity, and first impurity regions 5017 to 5020 are formed in a self-aligning manner. The impurity element to impart the n-type conductivity in the concentration range of $1\times10^{20}$ to $1\times10^{21}$ atoms/cm$^3$ is added to the first impurity regions 5017 to 5020. (FIG. 5B)

Next, as shown in FIG. 5C, a second etching process is performed without removing the resist mask 5010. The etching gas of the mixture of $CF_4$, $Cl_2$ and $O_2$ is used, and the W film is selectively etched. At this point, second shape conductive layers 5021 to 5026 (first conductive layers 5021a to 5026a and second conductive layers 5021b to 5026b) are formed by the second etching process. Regions of the gate insulating film 5007, which are not covered with the second shape conductive layers 5021 to 5026, are made thinner by about 20 to 50 nm by etching.

An etching reaction of the W film or the Ta film by the mixture gas of $CF_4$ and $Cl_2$ can be guessed from a generated radical or ion species and the vapor pressure of a reaction product. When the vapor pressures of fluoride and chloride of W and Ta are compared with each other, the vapor pressure of $WF_6$ being fluoride of W is extremely high, and other $WCl_5$, $TaF_5$, and $TaCl_5$ have almost equal vapor pressures. Thus, in the mixture gas of $CF_4$ and $Cl_2$, both the W film and the Ta film are etched. However, when a suitable amount of $O_2$ is added to this mixture gas, $CF_4$ and $O_2$ react with each other to form CO and F, and a large number of F radicals or F ions are generated. As a result, an etching rate of the W film having the high vapor pressure of fluoride is increased. On the other hand, with respect to Ta, even if F is increased, an increase of the etching rate is relatively small. Besides, since Ta is easily oxidized as compared with W, the surface of Ta is oxidized by addition of $O_2$. Since the oxide of Ta does not react with fluorine or chlorine, the etching rate of the Ta film is further decreased. Accordingly, it becomes possible to make a difference between the etching rates of the W film and the Ta film, and it becomes possible to make the etching rate of the W film higher than that of the Ta film.

Then, as shown in FIG. 6A, a second doping process is performed. In this case, a dosage is made lower than that of the first doping process and under the condition of a high acceleration voltage, an impurity element for imparting the n-type conductivity is doped. For example, the process is carried out with an acceleration voltage set to 70 to 120 keV and at a dosage of $1\times10^{13}$ atoms/cm$^2$, so that new impurity regions are formed inside of the first impurity regions formed into the island semiconductor layers in FIG. 5B. Doping is carried out such that the second shape conductive layers 5021 to 5026 are used as masks to the impurity element and the impurity element is added also to the regions under the tapered portions of the first conductive layers 5021a to 5026a. In this way, second impurity regions 5027 to 5031 are formed. The concentration of phosphorous (P) added to the second impurity regions 5027 to 5031 has a gentle concentration gradient in accordance with the thickness of tapered portions of the first conductive layers 5021a to 5026a. Note that in the semiconductor layer that overlap with the tapered portions of the first conductive layers 5021a to 5026a, the concentration of impurity element slightly falls from the end portions of the tapered portions of the first conductive layers 5021a to 5026a toward the inner portions, but the concentration keeps almost the same level.

As shown in FIG. 6B, a third etching process is performed. This is performed by using a reactive ion etching method (RIE method) with an etching gas of $CHF_6$. The tapered portions of the first conductive layers 5021a to 5026a are partially etched, and the region in which the first conductive layers overlap with the semiconductor layer is reduced by the third etching process. Third shape conductive layers 5032 to 5037 (first conductive layers 5032a to 5037a and second conductive layers 5032b to 5037b) are formed by the third etching process. At this point, regions of the gate insulating film 5007, which are not covered with the third shape conductive layers 5032 to 5037, are made thinner by about 20 to 50 nm by etching.

By the third etching process, in the second impurity regions 5027 to 5031, second impurity regions 5027a to 5031a which overlap with the first conductive layers 5032a to 5037a, and third impurity regions 5027b to 5231b between the first impurity regions and the second impurity regions are formed.

Then, as shown in FIG. 6C, by a third doping process, fourth impurity regions 5039 to 5044 having a conductivity type opposite to the first conductivity type are formed in the island semiconductor layers 5004 forming p-channel TFTs. The third conductive layers 5033b are used as masks to an impurity element, and the impurity regions are formed in a self-aligning manner. At this time, the whole surfaces of the island semiconductor layers 5003 and 5005 which form n-channel TFTs, the storage capacitor portion 5006, and the wiring portion 5034 are covered with a resist mask 5038. Phosphorus is added to the impurity regions 5039 to 5044 at different concentrations, respectively. The impurity regions are formed by an ion doping method using diborane ($B_2H_6$) and the impurity concentration is made $2\times10^{20}$ to $2\times10^{21}$ atoms/cm$^3$ in any of the impurity regions.

By the steps up to this, the impurity regions are formed in the respective island semiconductor layers. The third shape conductive layers 5032, 5033, 5035, and 5036 overlapping with the island semiconductor layers function as gate electrodes. The numeral 5034 functions as an island source signal line. The numeral 5037 functions as a capacitor wiring.

After the resist mask 5038 is removed, a step of activating the impurity elements added in the respective island semiconductor layers for the purpose of controlling the conductivity type. This step is carried out by a thermal annealing method using a furnace anneal. In addition, a laser annealing method or a rapid thermal annealing method (RTA method) can be applied. The thermal annealing method is performed in a nitrogen atmosphere having an oxygen concentration of 1 ppm or less, preferably 0.1 ppm or less and at 400 to 700° C., typically 500 to 600° C. In Embodiment 2, a heat treatment is conducted at 500° C. for 4 hours. However, in the case where a wiring material used for the third conductive layers 5032 to 5037 is weak to heat, it is preferable that the activation is performed after formation of an interlayer insulating film (containing silicon as its main ingredient) to protect the wiring line or the like.

Further, a heat treatment at 300 to 450° C. for 1 to 12 hours is conducted in an atmosphere containing hydrogen of 3 to 100%, and a step of hydrogenating the island semiconductor layers is conducted. This step is a step of terminating dangling bonds in the semiconductor layer by thermally excited hydrogen. As another means for hydrogenation, plasma hydrogenation (using hydrogen excited by plasma) may be carried out.

Next, a first interlayer insulating film 5045 of a silicon oxynitride film is formed with a thickness of 100 to 200 nm. Then, a second interlayer insulating film 5046 of an organic insulating material is formed thereon. After that, etching is carried out to form contact holes.

Then, in the driving circuit portion, source wirings 5047 and 5048 for contact with the source regions of the island semiconductor layers, and a drain wiring 5049 for contact with the drain regions of the island semiconductor layers are formed. In the pixel portion, a connecting electrode 5050 and pixel electrodes 5051 and 5052 are formed (FIG. 7A). The connecting electrode 5050 allows electric connection between the source signal line 5034 and writing TFTs. Further, the pixel electrode 5052 and the storage capacitor are in adjacent pixel.

In this embodiment, though the writing TFT is shown as a double gate structure, a single gate structure, a triple gate structure or even a multi gate structure can also be used.

As described above, the driving circuit portion having the n-channel TFT and the p-channel TFT and the pixel portion having the writing TFT and the storage capacitor can be formed on one substrate. Such a substrate is referred to as an active matrix substrate in this specification.

In this embodiment, end portions of the pixel electrodes are overlapped with source signal lines and writing gate signal lines for the purpose of shielding from light spaces between the pixel electrodes without using a black matrix.

Further, according to the process described in this embodiment, the number of photomasks necessary for manufacturing an active matrix substrate can be set to five (a pattern for the island semiconductor layers, a pattern for the first wirings (source signal lines and storage capacitor wirings), a mask pattern for the p-channel regions, a pattern for the contact holes, and a pattern for the second wirings (including the pixel electrodes and the connecting electrodes)). As a result, the process can be made shorter, the manufacturing cost can be lowered, and the yield can be improved.

Next, after the active matrix substrate as illustrated in FIG. 7B is obtained, an orientation film 5053 is formed on the active matrix substrate and a rubbing treatment is carried out.

Meanwhile, an opposing substrate 5054 is prepared. Color filter layers 5055 to 5057 and an overcoat layer 5058 are formed on the opposing substrate 5054. The color filter layers are structured such that the red color filter layer 5055 and the blue color filter layer 5056 overlap over the TFTs so as to serve also as a light-shielding film. Since it is necessary to shield from light at least spaces among the TFTs, the connecting electrodes, and the pixel electrodes, it is preferable that the red color filter and the blue color filter are arranged so as to overlap such that these places are shielded from light.

The red color filter layer 5055, the blue color filter layer 5056, and the green color filter layer 5057 are overlapped so as to align with the connecting electrode 5050 to form a spacer. The respective color filters are formed by mixing pigments in an acrylic resin and are formed with a thickness of 1 to 3 μm. These color filters can be formed from a photosensitive material in a predetermined pattern using a mask. Taking into consideration the thickness of the overcoat layer 5058 of 1 to 4 μm, the height of the spacer can be made to be 2 to 7 μm, preferably 4 to 6 μm. This height forms a gap when the active matrix substrate and the opposing substrate are adhered to each other. The overcoat layer 5058 is formed of a photosetting or thermosetting organic resin material such as a polyimide resin or an acrylic resin.

The arrangement of the spacer may be arbitrarily determined. For example, as illustrated in FIG. 7B, the spacer may be arranged on the opposing substrate 5054 so as to align with the connecting electrode 5050. Or, the spacer may be arranged on the opposing substrate 5054 so as to align with a TFT of the driving circuit portion. Such spacers may be arranged over the whole surface of the driving circuit portion, or may be arranged so as to cover the source wirings and the drain wirings.

After the overcoat layer 5058 is formed, an opposing electrode 5059 is patterned to be formed, an orientation film 5060 is formed, and a rubbing treatment is carried out.

Then, the active matrix substrate which the pixel portion and the driving circuit portion are formed thereon is adhered to the opposing substrate using a sealant 5062. Filler is mixed in the sealant 5062. The filler and the spacers help the two substrates to be adhered to each other with a constant gap therebetween. After that, a liquid crystal material 5061 is injected between the substrates, and sealing agent (not shown) carries out full encapsulation. As the liquid crystal material 5061, a known liquid crystal material may be used.

In this way, an active matrix liquid crystal display device as illustrated in FIG. 7B is completed.

After the opposing substrate is bonded to the active matrix substrate, the substrates may be separated into a plurality of respective active matrix display devices. In this regard, it is possible to utilize the method disclosed in U.S. Pat. Nos. 5,982,469 or 6,099,672 although other methods may be used. Entire disclosures of these patents are incorporated herein by reference.

It is to be noted that, though the TFTs in the active matrix type liquid crystal display device formed in the above processes are of a top-gate structure, this embodiment may be applied to TFTs of a bottom-gate structure and of other structures.

[Third Embodiment]

The following will describe a case of manufacturing a liquid crystal display apparatus using a glass substrate cutting from a mother glass in accordance with the invention, which is different from the second embodiment discussed previously.

Although the display apparatus according to the embodiment is illustrated as a liquid crystal display apparatus, the invention is not limited to a liquid crystal display apparatus, but can be adapted to an OLED-used display apparatus or a glass-used display apparatus, such as a PDP apparatus.

The following description exemplifies the fabrication process in case where the invention is adapted to a reflection type liquid crystal display apparatus, which is different from the liquid crystal display apparatus of the second embodiment.

According to the second embodiment, an active matrix substrate shown in FIG. 8A (similar to the one shown in FIG. 7A) is prepared. Subsequently, a resin film is formed as a third interlayer insulating film 5201 after which a contact hole is bored in the pixel electrode portion and a reflection electrode 5202 is formed there. It is desirable to use a material having an excellent reflectivity, such as a film essentially consisting of Al or Ag or the lamination of those films, as the reflection electrode 5202.

An opposing substrate 5054 is prepared. In this embodiment, an opposing electrode 5205 is formed by patterning on the opposing substrate 5054. The opposing electrode 5205 is formed as a transparent conductive film. An available material for the transparent conductive film is a compound of an indium oxide and tin oxide (which is called ITO) or a compound of an indium oxide and zinc oxide.

At the time of fabricating a color liquid crystal display apparatus, color filter layers, though not particularly illustrated, are formed. It is preferable that adjoining color filter layers of different colors be formed one on the other to serve as a light shielding film for the TFT portion.

Then, alignment films 5203 and 5204 are formed on the active matrix substrate and the opposing substrate and the resultant structure is subjected to a rubbing treatment.

Then, the active matrix substrate on which the pixel portion and the drive circuit portion are formed and the opposing substrate are adhered by a sealant 5206. As a filler is mixed in the sealant 5206, the two substrates are adhered together with a uniform distance provided by the filler and the spacer. Then, a liquid crystal material 5207 is filled between both substrates which are then completely sealed by a sealing agent (not shown). A known liquid crystal material can be used for the liquid crystal material 5207. A reflection type liquid crystal display apparatus as shown in FIG. 8B is completed this way.

After the opposing substrate is bonded to the active matrix substrate, the substrates may be separated into a plurality of respective active matrix display devices.

The invention can adapted to a semi-transmission type display apparatus where half the pixels are reflection electrodes and the remaining half are transparent electrodes.

Glass substrates for display apparatuses according to the related art suffered a low utilization factor of a mother glass.

According to the invention, the short side of a mother glass is aligned with one side of the glass substrate for a display apparatus. Alternatively, 1/n of the short side of the mother glass is aligned with one side of the glass substrate. This improves the utilization factor of the mother glass. Because the one side of the mother glass is used directly as the one side of the glass substrate in the invention, the mother glass is not wastefully used. This results in an improvement of the utilization factor of the mother glass.

TABLE 1

1600 × 1200 Quantity of panels extracted from glass substrate

| screen aspect | quantity | maximum panel size | screen area | panel area | total panel area | utilization factor % |
|---|---|---|---|---|---|---|
| 4:3 | 2 × 2 | 36.4 inch | 739 × 654 | 749 × 569 | 1498 × 1138 | 88.8 |
|  | 3 × 3 | 24 inch | 488 × 365 | 498 × 380 | 1494 × 1140 | 88.7 |
|  | 4 × 4 | 17.7 inch | 359 × 270 | 369 × 285 | 1476 × 1140 | 87.6 |
| 16:9 | 2 × 2 | 34 inch | 755 × 425 | 765 × 440 | 1530 × 880 | 70.1 |
|  | 2 × 3 | 29 inch | 644 × 362 | 654 × 377 | 1308 × 1131 | 77 |
|  | 3 × 3 | 21.6 inch | 479 × 269 | 489 × 284 | 1467 × 1137 | 86.8 |

Glass size 1600 × 1200
Usable range 1540 × 1140
Frame 15 vertical 10 horizontal (unit is mm)
utilization factor = glass substrate area/mother glass area

TABLE 2-1

1500 × 1125 Quantity of panels extracted from glass substrate

| screen aspect | quantity | maximum panel size | screen area | panel area | total panel area | utilization factor % |
|---|---|---|---|---|---|---|
| 4:3 | 2 × 2 | 33.9 inch | 689 × 517 | 699 × 532 | 1398 × 1064 | 88.1 |
|  | 3 × 3 | 22.3 inch | 453 × 340 | 463 × 355 | 1389 × 1065 | 87.7 |
|  | 4 × 4 | 16.5 inch | 334 × 251 | 344 × 266 | 1376 × 1064 | 86.8 |

TABLE 2-1-continued

1500 × 1125 Quantity of panels extracted from glass substrate

| screen aspect | quantity | maximum panel size | screen area | panel area | total panel area | utilization factor % |
|---|---|---|---|---|---|---|
| 16:9 | 2 × 2 | 32.0 inch | 710 × 399 | 720 × 414 | 1440 × 828 | 70.6 |
|  | 2 × 3 | 27.2 inch | 604 × 340 | 614 × 355 | 1228 × 1065 | 77.5 |
|  | 3 × 3 | 21.1 inch | 471 × 264 | 480 × 279 | 1440 × 837 | 71.4 |

Glass size 1500 × 1125
Usable range 1440 × 1065
Frame 15 vertical 10 horizontal (unit is mm)

TABLE 2-2

2000 × 1500 Quantity of panels extracted from glass substrate

| screen aspect | quantity | maximum panel size | screen area | panel area | total panel area | utilization factor % |
|---|---|---|---|---|---|---|
| 4:3 | 2 × 2 | 46.2 inch | 940 × 705 | 950 × 720 | 1900 × 1440 | 91.2 |
|  | 3 × 3 | 30.5 inch | 620 × 465 | 630 × 480 | 1890 × 1440 | 90.2 |
|  | 4 × 4 | 22.6 inch | 460 × 345 | 470 × 360 | 1880 × 1440 | 90.2 |
| 16:9 | 2 × 2 | 43.2 inch | 960 × 540 | 970 × 555 | 1940 × 1110 | 71.8 |
|  | 2 × 3 | 37.2 inch | 826 × 465 | 836 × 480 | 1672 × 1440 | 80.2 |
|  | 3 × 3 | 28.6 inch | 636 × 357 | 646 × 372 | 1938 × 1116 | 72.1 |

Glass size 2000 × 1500
Usable range 1940 × 1440
Frame 15 vertical 10 horizontal (unit is mm)

TABLE 2-3

2600 × 1500 Quantity of panels extracted from glass substrate

| screen aspect | quantity | maximum panel size | screen area | panel area | total panel area | utilization factor % |
|---|---|---|---|---|---|---|
| 4:3 | 2 × 2 | 46.2 inch | 940 × 705 | 950 × 720 | 1900 × 1440 | 70.1 |
|  | 3 × 2 | 41.1 inch | 836 × 627 | 846 × 642 | 2538 × 1284 | 83.5 |
|  | 4 × 3 | 30.5 inch | 620 × 465 | 630 × 480 | 2520 × 1440 | 93 |
| 16:9 | 2 × 2 | 56.4 inch | 1253 × 705 | 1263 × 720 | 2526 × 1440 | 93.2 |
|  | 3 × 3 | 37.2 inch | 826 × 465 | 836 × 480 | 2508 × 1440 | 92.6 |
|  | 4 × 4 | 27.6 inch | 613 × 345 | 623 × 360 | 2492 × 1440 | 92 |

Glass size 2600 × 1500
Usable range 2540 × 1440
Frame 15 vertical 10 horizontal (unit is mm)
utilization factor = total panel area/glass area

What is claimed is:

1. A method of manufacturing a glass substrate comprising:
    cutting a rectangular shaped mother glass into at least four glass substrates, and
    dividing said one of the four glass substrates into four panels or nine panels,
    wherein one side of the rectangular shaped mother glass is aligned with one side of at least two of the four glass substrates;
    wherein one of the four glass substrates has a first cross point by two orthogonal sides of said one of the four glass substrates;
    wherein the rectangular shaped mother glass has a second cross point by two orthogonal sides of the rectangular shaped mother glass;
    wherein the first cross point is overlapped with the second cross point;
    wherein each of the four glass substrates has a same size with each other, and
    wherein each of the four glass substrates has an aspect ratio of 4:3.

2. The method of manufacturing the glass substrate according to claim 1, wherein a thin film transistor is formed over at least one of the four glass substrates.

3. A method of manufacturing a panel comprising:
    cutting a rectangular shaped mother glass into at least four glass substrates, wherein one side of the rectangular shaped mother glass is aligned with one side of at least two of the four glass substrates, and
    forming a plurality of thin film transistors over at least one of the four glass substrates; and
    dividing said one of the four glass substrates into four panels or nine panels after forming the plurality of thin film transistors;
    wherein one of the four glass substrates has a first cross point by two orthogonal sides of said one of the four glass substrates;
    wherein the rectangular shaped mother glass has a second cross point by two orthogonal sides of the rectangular shaped mother glass;
    wherein the first cross point is overlapped with the second cross point,
    wherein each of the four glass substrates has a same size with each other, and wherein each of the four glass substrates has an aspect ratio of 4:3.

4. A method of manufacturing a glass substrate comprising the steps of:
preparing a rectangular shaped mother glass by float method; and
cutting the rectangular shaped mother glass into at least four glass substrates, and
dividing said one of the four glass substrates into four panels or nine panels,
wherein one side of the rectangular shaped mother glass is aligned with one side of at least two of the four glass substrates,
wherein one of the four glass substrates has a first cross point by two orthogonal sides of said one of the four glass substrates;
wherein the rectangular shaped mother glass has a second cross point by two orthogonal sides of the rectangular shaped mother glass;
wherein the first cross point is overlapped with the second cross point,
wherein each of the four glass substrates has a same size with each other, and wherein each of the four glass substrates has an aspect ratio of 4:3.

5. The method of manufacturing the glass substrate according to claim 4, wherein a thin film transistor is formed over at least one of the four glass substrates.

6. A method of manufacturing a glass substrate comprising:
cutting a rectangular shaped mother glass into at least four glass substrates, and
dividing said one of the four glass substrates into four panels or nine panels,
wherein one side of the rectangular shaped mother glass is aligned with one side of at least two of the four glass substrates;
wherein one of the four glass substrates has a first cross point by two orthogonal sides of said one of the four glass substrates;
wherein the rectangular shaped mother glass has a second cross point by two orthogonal sides of the rectangular shaped mother glass;
wherein the first cross point is overlapped with the second cross point;
wherein each of the four glass substrates has a same size with each other, and
wherein each of the four glass substrates has an aspect ratio of 16:9.

7. The method of manufacturing the glass substrate according to claim 6, wherein a thin film transistor is formed over at least one of the four glass substrates.

8. A method of manufacturing a panel comprising:
cutting a rectangular shaped mother glass into at least four glass substrates, wherein one side of the rectangular shaped mother glass is aligned with one side of at least two of the four glass substrates,
forming a plurality of thin film transistors over at least one of the four glass substrates; and
dividing said one of the four glass substrates into four panels or nine panels after forming the plurality of thin film transistors;
wherein one of the four glass substrates has a first cross point by two orthogonal sides of said one of the four glass substrates;
wherein the rectangular shaped mother glass has a second cross point by two orthogonal sides of the rectangular shaped mother glass;
wherein the first cross point is overlapped with the second cross point,
wherein each of the four glass substrates has a same size with each other, and
wherein each of the four glass substrates has an aspect ratio of 16:9.

9. A method of manufacturing a glass substrate comprising the steps of:
preparing a rectangular shaped mother glass by float method;
cutting the rectangular shaped mother glass into at least four glass substrates, and
dividing said one of the four glass substrates into four panels or nine panels,
wherein one side of the rectangular shaped mother glass is aligned with one side of at least two of the four glass substrates,
wherein one of the four glass substrates has a first cross point by two orthogonal sides of said one of the four glass substrates;
wherein the rectangular shaped mother glass has a second cross point by two orthogonal sides of the rectangular shaped mother glass;
wherein the first cross point is overlapped with the second cross point,
wherein each of the four glass substrates has a same size with each other, and
wherein each of the four glass substrates has an aspect ratio of 16:9.

10. The method of manufacturing the glass substrate according to claim 9, wherein a thin film transistor is formed over at least one of the four glass substrates.

* * * * *